(12) United States Patent
Cao et al.

(10) Patent No.: US 9,983,816 B1
(45) Date of Patent: May 29, 2018

(54) MANAGING DISK DRIVE POWER SAVINGS IN DATA STORAGE SYSTEMS

(71) Applicants: Christine G. Cao, Acton, MA (US); Joseph C. Caiani, Boston, MA (US); Andrew P. Kubicki, Westborough, MA (US); Russell R. Laporte, Webster, MA (US); Jingyan Zhao, Harvard, MA (US)

(72) Inventors: Christine G. Cao, Acton, MA (US); Joseph C. Caiani, Boston, MA (US); Andrew P. Kubicki, Westborough, MA (US); Russell R. Laporte, Webster, MA (US); Jingyan Zhao, Harvard, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 522 days.

(21) Appl. No.: 13/632,105

(22) Filed: Sep. 30, 2012

(51) Int. Cl.
*G06F 3/06* (2006.01)

(52) U.S. Cl.
CPC .................................. *G06F 3/0625* (2013.01)

(58) Field of Classification Search
CPC ........ G06F 3/067; G06F 3/0683; G06F 3/0689; G06F 3/0625; G06F 1/3221; G06F 1/3203; G06F 1/3268
See application file for complete search history.

(56) References Cited

U.S. PATENT DOCUMENTS

| | | | | |
|---|---|---|---|---|
| 2007/0143542 A1* | 6/2007 | Watanabe | ............. | G06F 3/0634 711/114 |
| 2008/0080838 A1* | 4/2008 | Yoshida | ................. | H04N 5/772 386/279 |
| 2008/0294920 A1* | 11/2008 | Hatasaki et al. | .............. | 713/323 |
| 2010/0121892 A1* | 5/2010 | Matsumoto et al. | ......... | 707/822 |
| 2011/0208911 A1* | 8/2011 | Taguchi et al. | ............... | 711/114 |
| 2011/0283123 A1* | 11/2011 | Shigemura et al. | .......... | 713/320 |

* cited by examiner

*Primary Examiner* — Mohammed Rehman
*Assistant Examiner* — Alyaa T Mazyad
(74) *Attorney, Agent, or Firm* — Krishnendu Gupta; John T. Hurley

(57) ABSTRACT

A method is used in managing disk drive power saving in data storage systems. Multiple data storage systems storage elements capable of operating in a power saving mode are identified and grouped into a RAID group. One or more logical units are created from the RAID group. The one or more logical units are exposed to a server. The one or more logical units are associated to an application at the server. Power saving settings are determined. A power saving mode based on the power saving settings is enabled.

20 Claims, 12 Drawing Sheets

MANAGING DISK DRIVE POWER SAVINGS IN DATA STORAGE SYSTEMS

BACKGROUND

Technical Field

This application relates to managing disk drive power savings in data storage systems.

Description of Related Art

A data storage array (herein also referred to as a "data storage system", "disk storage array", "storage array", "disk array", or simply "array") is a collection of physical data storage devices such as hard disk drives (also referred to simply as "disks" or "drives") operating together logically as a unified storage device designed to store large quantities of data. Storage arrays typically include one or more storage array processors (SPs), for handling input/output (I/O) requests and management type requests. An SP is the controller for and primary interface to the storage array.

Storage systems may include one or more disk arrays. Disk arrays may use a variety of storage devices with various characteristics for providing storage. Each storage array may logically operate as a unified storage device. While such organization generally allows for a homogenous view of the storage devices, it is sometime useful to organize the various storage devices into tiers or classes of storage. A tier is generally delineated by device differences in at least one of the four following attributes: price, performance, capacity and function. For example, tier 1 storage devices may be comprised of storage media that is very fast, such as solid state (e.g., flash) memory. Tier 2 storage devices may be comprised of storage media that are slower than tier 1 media (e.g., hard disks). For example, tier 2 storage devices may include high performance disks such as 15,000 RPM serial attached SCSI (SAS) or Fibre Channel (FC) disks. Tier 3 storage devices may be comprised of comparatively slower and cheaper storage media than either tier 1 or tier 2, such as 7,200 RPM serial ATA (SATA) disks.

A storage tier may be made up of different types of disks, i.e., disks with different RAID (Redundant Array of Independent or Inexpensive Disks) levels, performance and cost characteristics. Several levels of RAID systems have been defined in the industry. RAID parity schemes may be utilized to provide error detection during the transfer and retrieval of data across a storage system. The first level, RAID-0, combines two or more drives to create a larger virtual disk. In a dual drive RAID-0 system one disk contains the low numbered sectors or blocks and the other disk contains the high numbered sectors or blocks, forming one complete storage space. RAID-0 systems generally interleave the sectors of the virtual disk across the component drives, thereby improving the bandwidth of the combined virtual disk. Interleaving the data in that fashion is referred to as striping. RAID-0 systems provide no redundancy of data, so if a drive fails or data becomes corrupted, no recovery is possible short of backups made prior to the failure.

RAID-1 systems include one or more disks that provide redundancy of the virtual disk. One disk is required to contain the data of the virtual disk, as if it were the only disk of the array. One or more additional disks contain the same data as the first disk, providing a "mirror" of the data of the virtual disk. A RAID-1 system will contain at least two disks, the virtual disk being the size of the smallest of the component disks. A disadvantage of RAID-1 systems is that a write operation must be performed for each mirror disk, reducing the bandwidth of the overall array. In a dual drive RAID-1 system, the first disk and the second disk contain the same sectors or blocks, each disk holding exactly the same data.

RAID-4 systems are similar to RAID-0 systems, in that data is striped over multiple drives. For example, the storage spaces of two disks are added together in interleaved fashion, while a third disk contains the parity of the first two disks. RAID-4 systems are unique in that they include an additional disk containing parity. For each byte of data at the same position on the striped drives, parity is computed over the bytes of all the drives and stored to the parity disk. An XOR operation or other checksum computation can be used to compute parity, providing a fast and symmetric operation that can regenerate the data of a single drive, given that the data of the remaining drives remains intact.

RAID-5 systems are similar to RAID-4 systems, with the difference that the parity information is striped over all the disks with the data. For example, first, second, and third disks may each contain data and parity in interleaved fashion. Distributing the parity data generally increases the throughput of the array as compared to a RAID-4 system. RAID-5 systems may continue to operate though one of the disks has failed. RAID-6 systems are like RAID-5 systems, except that dual parity is kept to provide for normal operation if up to two drives fail.

Combinations of RAID systems are also possible. For example, a four disk RAID 1+0 system provides a concatenated file system that is also redundant. The first and second disks are mirrored, as are the third and fourth disks. The combination of the mirrored sets forms a storage space that is twice the size of one individual drive, assuming that all four are of equal size. Many other combinations of RAID systems and other RAID types are possible.

One factor that may limit the performance of a storage array is the performance of each individual storage component. For example, the read access time of a disk storage array may be constrained by the access time of the disk drive from which the data is being read. Read access time of a drive may be affected by physical characteristics of the disk drive including the number of revolutions per minute of the spindle: the faster the spin, the less time it takes for the sector being read to come around to the read/write head.

A large data storage array is an illustrative example. A data storage array may be thought of as a system for managing a large amount of a resource such as disk sectors. Management of the resource may include allocation of a portion the resource in response to allocation requests or relocation of previously allocated resources. In the storage array example, portions of the storage array may be allocated to (e.g., exclusively used by) entities that request such allocation. One issue that may be considered by a SP executing a policy for determining where to store data within the array (e.g., a slice allocation or relocation policy) is how to balance between performance and power consumption of the array.

Certain disk drives have the capability reduce power consumption by reducing the spin rate of disks in the hard drive. A drive with such power saving capability allows power to the motor that spins the disk to be reduced, resulting in power savings. Other types of drives allow disks to be spun at reduced spin rates.

SUMMARY OF THE INVENTION

A method is used in managing disk drive power saving in data storage systems. Multiple data storage systems storage elements capable of operating in a power saving mode are identified and grouped into a RAID group. One or more logical units are created from the RAID group. The one or more logical units are exposed to a server. The one or more logical units are associated to an application at the server. Power saving settings are determined. A power saving mode based on the power saving settings is enabled.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
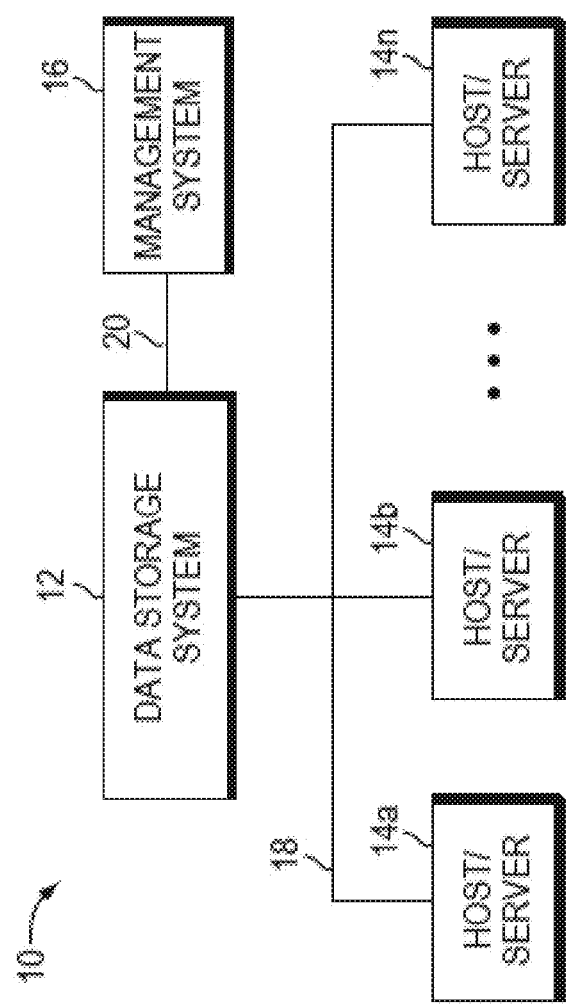
FIG. 1 is an example embodiment of a computer system that may utilize the techniques described herein.

Energy consumption is a major concern in data storage systems, where a significant portion of the energy consumed is by the disk drives, especially the motors that spin the physical disks. In data storage systems, I/O requests for data may be not evenly distributed and some data may be frequently accessed (hereinafter, "hot" data) and some data may be infrequently accessed (hereinafter, "cold" data).

Modern disk drives typically have several power modes: active, idle, standby, and sleep, each respectively utilizing less power, that allow disks to be spun down during idle time to save energy. In the active mode, a disk is actively seeking, writing or reading with the platters are spinning at full speed. In the idle mode, the platters remain spinning but the read/write electronics are off and the disk head may be parked. In the standby mode, the platters are not rotating. The sleep mode shuts off power to all remaining electronics.

Switching between levels requires time and energy depending on the transition. The switch between active and idle is almost instantaneous with little change in energy consumption; accordingly, the disk can quickly switch between the idle and active modes. Therefore, the active and idle modes may be used interchangeably throughout with respect to energy consumption (i.e., full power). In addition, it may be appreciated that many conventional power management policies implemented by the disk controller assume only two power states or modes: a full power state (e.g., active) and a low power state (e.g., standby or sleep). Accordingly, for simplicity of discussion, the same assumption is used below. However, this is not intended to be limiting and power management policies having more than two power states may be implemented without departing from the scope of the subject matter described herein.

The standby mode consumes less power over time; however, to serve a request, a disk must return to the active mode which requires both time and energy. The transition from full power mode to a low power mode is referred to as "spin down" and the transition from a low power mode to high power mode as "spin up." A disk must remain in low power mode for a period of time, the "break-even" time, to compensate for the additional energy expense. The break-even time for a disk drive depends on its operational parameters. As previously mentioned, the disk requires extra energy and time to spin down and then spin up. For a particular disk, there is a time period during which it costs the same amount of energy to keep the disk in full power mode or to spin the disk down, stay in the low power mode and then spin it up (i.e., the break-even time). Furthermore, disk activities can be viewed as a sequence of disk accesses, each of which is represented by its access time. The time period between two successive accesses may be hereinafter referred to as an idle interval or idle time.

Thus, drives having the ability to be placed in a low power state provide the capability to reduce overall power consumed by date storage systems. However simply polling the data storage system and spinning down unused disks may not be a viable nor effective solution in some system configurations. Such an approach may result in data unavailability issues, and, in certain situations, may actually result in increased power usage. Furthermore, spinning down one disk that is part of a RAID configuration may place the RAID redundancy feature at risk.

Consequently, imprudent use of power down may increase response time such that the ability to service I/O in placed in danger, thereby putting certain applications at risk. For example, should a request for the data residing on a disk that has spun down be received, it may take seconds or tens of seconds for the disk to spin up and provide the data. Such a delay may result then a timeout. For some applications such latency may be unacceptable. Complicating the determination of the worthiness and benefits of spin down is the need to take into account RAID configurations where a group of disks or several groups of disks may need to be considered in such a determination A RAID group includes multiple disk drives where the disk drives are typically of a same type (e.g., SATA) and capacity and, thus, can operate successfully together to provide the characteristics and benefits of a particular RAID type. However, although these drives may satisfy requirements for RAID configurations they may differ in other characteristics. For example, one disk may have the ability to spin down whereas another disk drive may not have this capability.

RAID configurations typically read and write data across all disks in the RAID group in what is referred to as a stripe. Consequently, when reading/writing from/to a RAID group, all disks are being read from or written to at essentially the same time. As a result, techniques described herein are provided to maximize power savings for all disk drives in a RAID group that have the capability to spin down. A RAID group comprising half spin down hard drives and non-spin down hard drives may not provide sufficient power savings to enable spin down due to the fact that RAID groups read/write data to all drives as a stripe.

At a high level, techniques described herein provide a management system and method capable of considering multiple disks and I/O characteristics system wide at a finer granularity to more effectively implement a spin down policy.

Thus, example embodiments may employ techniques described herein to manage disk drive power saving in data storage systems. Multiple data storage systems storage elements capable of operating in a power saving mode may be identified and grouped into a RAID group. One or more logical units (referred to interchangeably herein as LU or LUN) may be created from the RAID group. The one or more logical units may be exposed to a server. The one or more logical units may be associated to an application at the server. Power saving settings may be determined. A power saving mode based on the power saving settings may be determined, enabled, or changed.

Alternative example embodiments may include providing a graphical user interface (GUI) for displaying current selection of multiple system and power saving specific parameters associated with the power saving techniques described herein. The GUI may receive input from a user, such as to change or configure various power saving settings. The GUI may allow the user to associate one or more settings to the storage system as a whole, and/or RAID group as a whole. Alternatively, settings may be applied to an individual drive within a RAID group. LUNs may be created, arranged, or rearranged to increase the likelihood that storage elements in a RAID group remain idle for extended periods of time. For example, LUNs that are busy during the day may be grouped together in the same RAID group so that the associated RAID may experience less I/O activity during the evening, and consequently, more likely to be spun down for a longer period of time. The techniques may implement logging features to gather and record various system performance metrics useful for power saving determination. The metrics may be used to create reports to determine, for example, actual power savings, and to determine ways to increase power savings based on potential system configuration changes and the like.

Alternative example embodiments may include the ability to power down a subset of drives within a particular RAID group. These embodiments may be useful for a RAID group where some drives have spin down capability and other drives do not. Such embodiments may not save as much power as with RAID groups that contain all spin down capable drives; however there may be situations where spinning down a subset of hard drives may save power. This example, disks may be shut down after being idle for certain amount of time (e.g., 30 min.) on a disk by disk basis rather than addressing it at the RAID group level.

Referring now to FIG. 1, shown is an example embodiment of a computer system that may be used in connection with performing the technique or techniques described herein. The computer system 10 includes one or more data storage systems 12 connected to host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In at least one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, FCoE and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In at least one embodiment, the hosts may communicate with the data storage systems over an iSCSI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16. The manager may also configure a data storage system, for example, by using management software to define a logical grouping of logically defined devices, referred to elsewhere herein as a storage group (SG), and restrict access to the logical group.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes. An address map kept by the storage array may associate host system logical address with physical device address.

The data storage system 12 may include any one or more different types of disk devices such as, for example, an ATA disk drive, FC disk drive, and the like. Thus, the storage system may be made up of physical devices with different physical and performance characteristics (e.g., types of physical devices, disk speed such as in RPMs), RAID levels and configurations, allocation of cache, processors used to service an I/O request, and the like. The dynamic aspects of performance characteristics may include, for example, aspects related to current I/O performance such as AST (average service time) representing the average amount of time it takes to service an event (e.g., service an I/O request), ART (average response time) based on the AST, and the average amount of time the I/O request waits. Dynamic aspects may also include, for example, utilization of different data storage system resources (e.g., particular logical or physical devices, CPU), measurement of cache hits and/or misses, and the like. The dynamic aspects may vary with application workload, such as when particular applications may be more heavily performing I/O operations.

Given the different performance characteristics, one or more tiers of storage devices may be defined. The physical devices may be partitioned into tiers based on the performance characteristics of the devices; grouping similar performing devices together. An embodiment using the techniques herein may define a hierarchy of multiple tiers. Conversely, the particular performance characteristics may be applied to a storage pool with or without the definition of tiers. The set of resources associated with or designated for use by a tier or grouping within a pool may be characterized as a dynamic binding in that the particular set of data storage system resources utilized by consumers in a tier may vary from time to time. A current configuration for the data storage system, static aspects of the current data storage system resources (e.g., types of devices, device storage capacity and physical device characteristics related to speed and time to access data stored on the device), and current workload and other dynamic aspects (e.g., actual observed performance and utilization metrics) of the data storage system may vary at different points in time.

In such an embodiment in which element 12 of FIG. 1 is implemented using one or more data storage systems, each of the data storage systems may include code thereon for performing the techniques as described herein. In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the data storage system 12 may also include other components than as described for purposes of illustrating the techniques herein.

Figure 2:
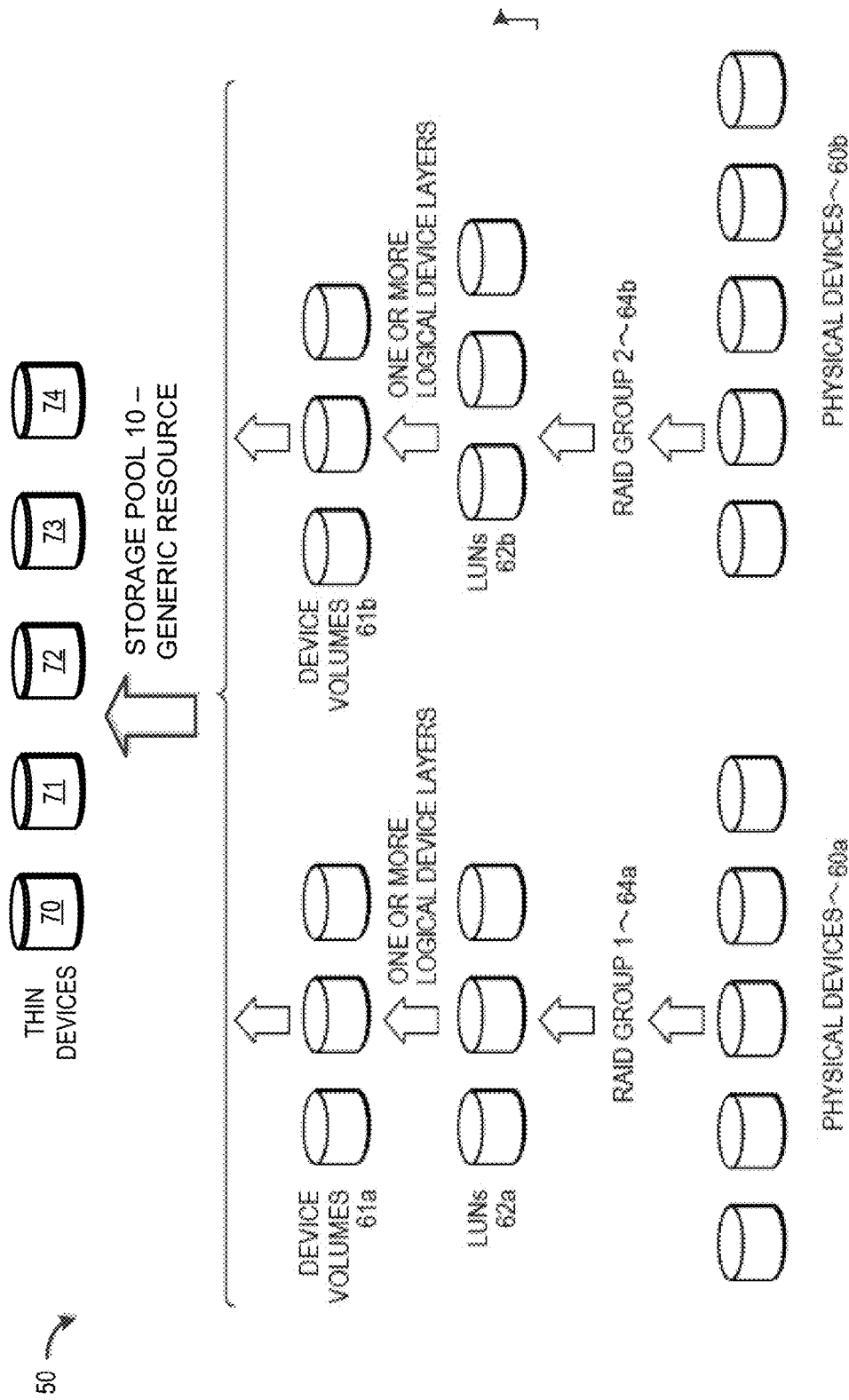
FIG. 2 is an example representation of how storage pools may be configured from physical devices in an example embodiment.

Referring to FIG. 2, shown is an example representing how data storage system best practices may be used to form storage pools. The example 50 illustrates how storage pools may be constructed from groups of physical devices. For example, RAID Group 1 64a may be formed from physical devices 60a. The data storage system best practices of a policy may specify the particular disks and configuration for the type of storage pool being formed. For example, for physical devices 60a on a first data storage system type when forming a storage pool, RAID-5 may be used in a 4+1 configuration (e.g., 4 data drives and 1 parity drive). The RAID Group 1 64a may provide a number of data storage LUNs 62a. An embodiment may also utilize one or more additional logical device layers on top of the LUNs 62a to form one or more logical device volumes 61a. The particular additional logical device layers used, if any, may vary with the data storage system. It should be noted that there may not be a 1-1 correspondence between the LUNs of 62a and the volumes of 61a. In a similar manner, device volumes 61b may be formed or configured from physical devices 60b. The storage pool 10 of the example 50 illustrates two RAID groups being used to define a single storage pool although, more generally, one or more RAID groups may be used for form a storage pool in an embodiment using RAID techniques.

The data storage system 12 may also include one or more thin devices 70-74. A thin device (also referred to as "thin logical unit") presents a logical storage space to one or more applications running on a host where different portions of the logical storage space may or may not have corresponding physical storage space associated therewith. However, the thin device is not mapped directly to physical storage space. Instead, portions of the thin storage device for which physical storage space exists are mapped to data devices such as device volumes 61a-61b, which are logical devices that map logical storage space of the data device to physical storage space on the physical devices 60a-60b. Thus, an access of the logical storage space of the thin device results in either a null pointer (or equivalent) indicating that no corresponding physical storage space has yet been allocated, or results in a reference to a data device which in turn references the underlying physical storage space.

Figure 3:
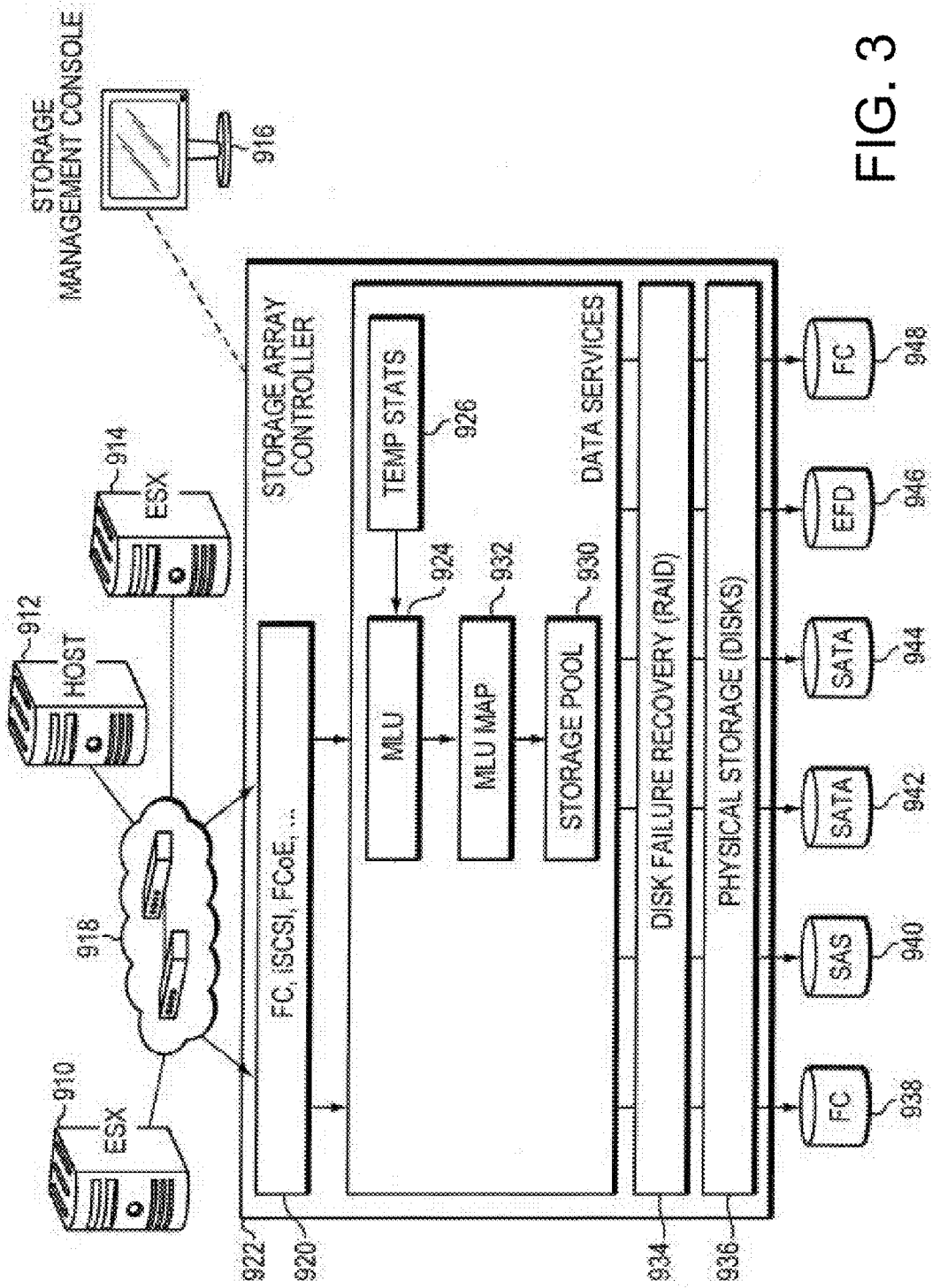
FIG. 3 is an example embodiment of a computer system in further detail that may utilize the techniques described herein.

FIG. 3 provides an overall diagram of an enhanced data storage system and environment. The techniques described herein may be incorporated into such system in any of a variety of ways. With respect to external connections, such system may have any I/O connection (e.g., Fibre Channel (FC), Serial Attach SCSI (SAS), or iSCSI) to host systems (e.g., server 912) and/or virtual environments (e.g., ESX servers 910, 914) by way of direct connect or data communications switch fabric 918. The storage system can be managed by way of a management console 916 that allows the administrator to monitor and control operation of the storage system. The storage system connects with physical disks such as Fibre Channel 938, 948, Serial Attach SCSI 940, Serial ATA 942, 944, or Enterprise Flash Drives (EFD) 946. The storage system uses the physical disks to persistently store data for the host systems.

With respect to storage system components, the storage system has a number of internal components including a storage array controller 922. An MLU map 932 with other components 920 handles connections (e.g., FC or iSCSI) with host systems and passes I/O, i.e., read or write requests, to a Mapped Logical Unit (MLU) component 924. The MLU provides the abstraction of a LUN to the host systems. As described below, the MLU makes use of the MLU map that identifies where the data is stored.

The storage system provides a mechanism 934 to help handle the failure of a physical storage 936 (e.g., disks) by using RAID algorithms to build logical abstractions of storage from physical disks. Such mechanisms provide for continued access to such logical abstractions even when a disk has failed and the system is mitigating the failure with the RAID algorithms. The logical abstraction presented by the RAID algorithms can be structured into uniform size units called slices with all the slices on a set of disks considered to be a storage pool (e.g., pool 930). The storage pool is thus an abstraction of RAID protected uniform size objects called slices.

The set of slices in the storage pool that are allocated for use for a particular user LUN is called a sparse meta volume. When a MLU needs additional space, the MLU asks the storage pool to allocate another slice from a free slice list and the MLU then adds the slice to the sparse meta volume for the MLU.

The MLU map is a multi level hierarchal directory of pointers to data. As the size of the data increases, the number of levels increases as well. The MLU uses the MLU map to look up where data has been saved. In at least some cases, the first levels are indirect blocks (e.g., block 952) which identify other levels of the directory. Eventually the directory entries identify the lowest level of the indirect blocks which point to the actual location for the data.

As mentioned above, the MLU and MLU map provide the abstraction of a LUN to host systems. Additional information regarding MLU abstraction can be found in U.S. patent application Ser. No. 12/751,455, entitled "MANAGING COMPRESSION IN DATA STORAGE SYSTEMS", filed 31 Mar. 2010 which application is hereby incorporated herein in its entirety.

FIGS. 4-12 depict example embodiments illustrating various graphical user interfaces implementing techniques for use managing disk drive power saving in data storage systems. Such techniques may include: identifying, in a data storage system, multiple storage elements capable of operating in a power saving mode; grouping the identified storage elements into a RAID group; creating one or more logical units (LUNs) from the RAID group; exposing the one or more LUNs to a server; associating the one or more LUNs to an application at the server; determining power saving settings; and enabling a power saving mode based on the power saving settings.

Figure 4:
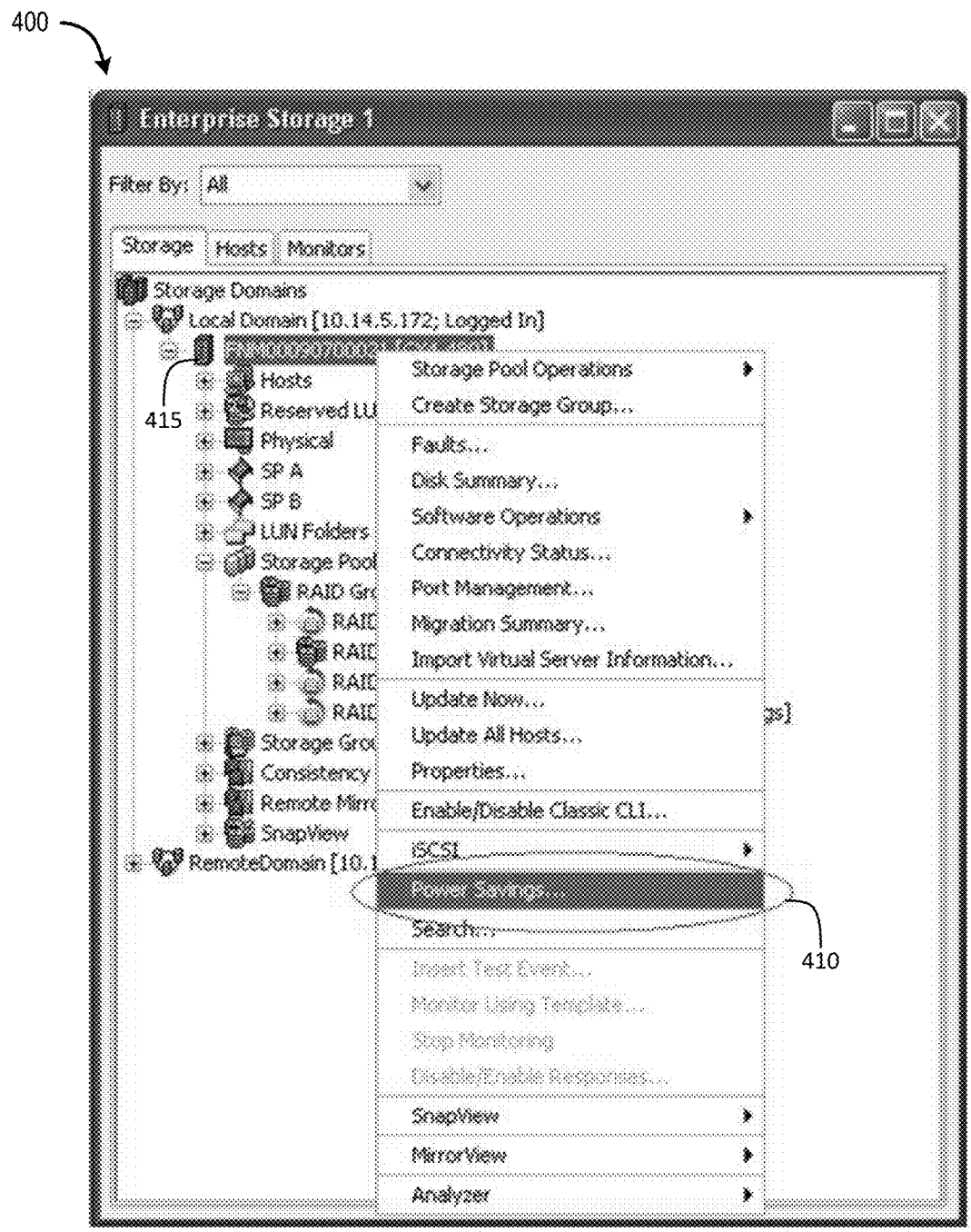
FIGS. 4-10 are example embodiments illustrating graphical user interface implementations that may utilize the techniques described herein.

Referring to FIG. 4, shown is a Storage System Power Saving 400 Dialog GUI that depicts a data storage system at the storage system level. There may be a context menu item "Power Savings" 410 under the array tree node. Clicking Power Savings may cause a new dialog "Storage System Power Savings" to be displayed. If the Disk Power Saving feature is not supported, the context menu item Power Savings will not be available.

Figure 5:
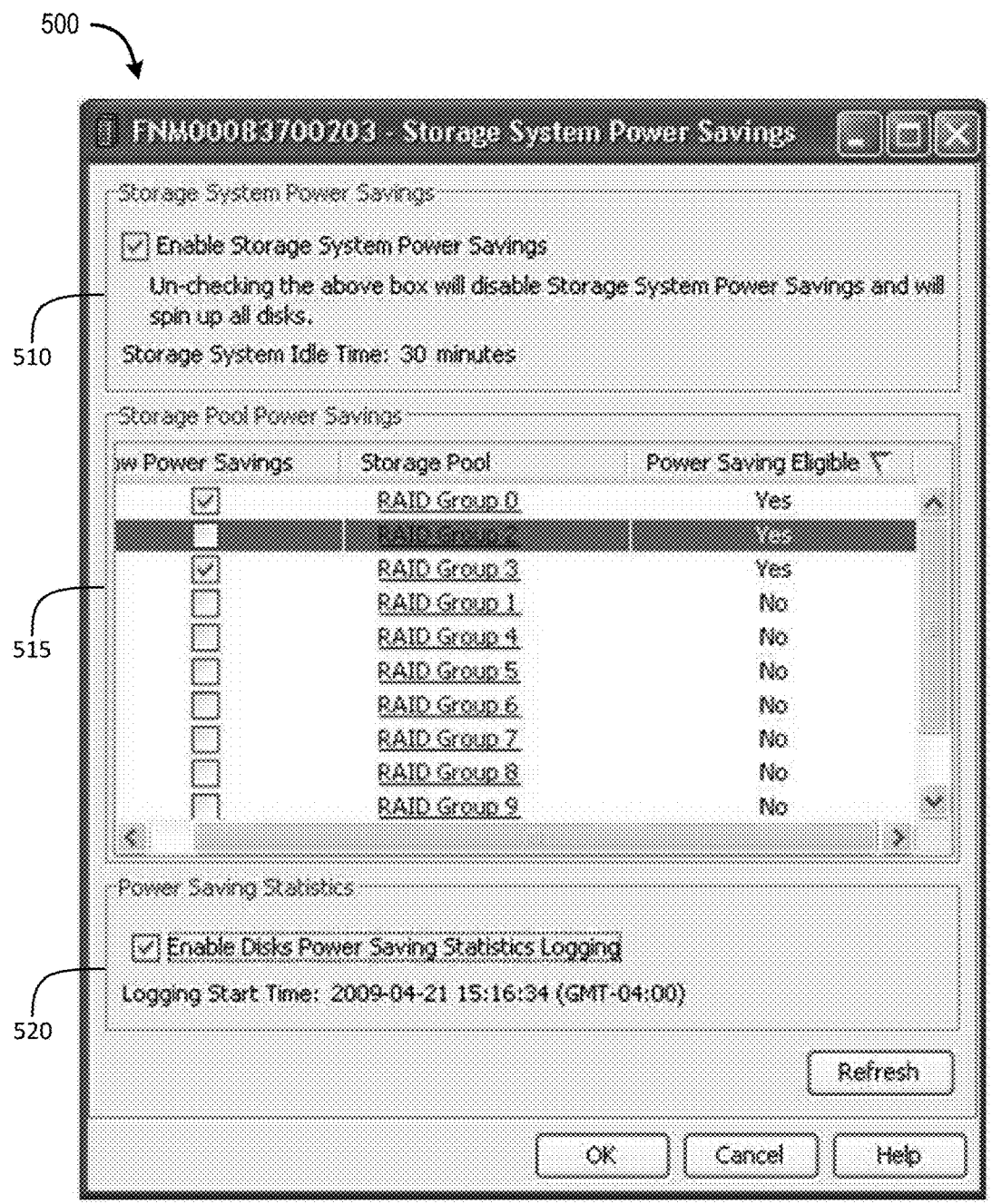

FIG. 5 illustrates the Storage System Power Savings 500 dialog GUI in further detail. There may be three sections within this dialog GUI including a Storage System Power Savings 510, Storage Pool Power Savings 515, and Power Saving Statistics 520.

The Storage System Power Savings 510 section may contain an Enable Storage System Power Savings checkbox with a default value of off and the check box unchecked. In order to provide the safest level of default configuration, the value is unchecked out of the box in order to prevent unwanted disk spin downs. When a user checks this box, the unused qualified disks will enter Lower Power (e.g., drive spin rate will be reduced to zero). If Allow Power Saving check box of a RAID group is checked (described below), all disks in a RAID group containing no bound LUNs as well as disks which are not members of any RAID Group will enter Lower Power. If there is no driver present on stack, disks with bound LUNs in a RAID group will enter Lower Power after an idle time is exceeded. When the box is unchecked, all drives will exit Lower Power where all drives may enter Reduced Power mode by transitioning to Full Power state (Transition Full). There may be a note that displays a description detailing Enable Storage System Power Savings information, such as, "Checking the above box will spin down all qualified unused disks. All power saving settings on storage pools will take effect." If the box is checked, a message such as "Un-checking the above box will disable Storage System Power Savings and will spin up all disks" may be displayed. A Storage System Idle Time may also be included. This field includes a value in minutes that represents the amount of time a drive may be idle before being placed in Lower Power mode. The value may be a storage system wide value.

The Storage Pool Power Savings section 515 may include a table with columns for each RAID group. An Allow Power Savings column includes a check box that allows the user to enable power savings on a per RAID group basis. In the case when Power Saving Eligible is no and the Allow Power Saving check box is unchecked for a RAID group, the check box may be grayed out and there may be a tooltip text message such as "RAID Group Disks Power Saving is not eligible. Don't allow power savings" to show a user why this check box can not be checked. The storage Pool column provides to link to the RAID group power saving dialog for the currently selected RAID group. The Power Saving Eligible column may display the Power Saving eligibility of the RAID group. This can be used to indicate if the disks in the RAID group are eligible to spin down. If the value of the Power Saving Eligible is No, there may be a tooltip text message such as "Drives do not support power savings" to indicate to the user why the power saving for this RAID group is not eligible.

The Power Saving Statistics section 520 may include an Enable Disk Power Saving Statistics Logging checkbox. Checking the check box may make Power Saving Statistics Counters available on Power Settings tab of the disk properties dialog. Unchecking this check box will result in the data of Power Saving Statistics Counters being grayed out. The Power Saving Statistics section 520 may also include a Logging Start Time field which, if enabled, will show the value of Logging Start Time. Otherwise, it will display "Unavailable." If the Disk Power Saving feature is supported, the default condition of Power Saving Statistics Logging will be off. By checking the box, data relating to Power Saving Statistics Counters on a disk will be available from the last retrieved time. Disk spin-down statistics (Power Savings Stats) may also be measured and provided in an additional field (not shown).

There may be situations where spin down may not be allowed, such as the case with layered drivers used with replication software applications. In this case, the dialog box 500 may cause an error message to appear when a user executes the following steps: a) user selects Allow Power Savings in the table of Storage Pool Power Savings; b) User does not select Enable Storage System Power Savings; and c) User clicks OK. In such cases, an example error message may include "The selected RAID groups are not able to spin down until you select Enable Storage System Power Savings in this dialog" so as to alert the user of the error.

Figure 6:
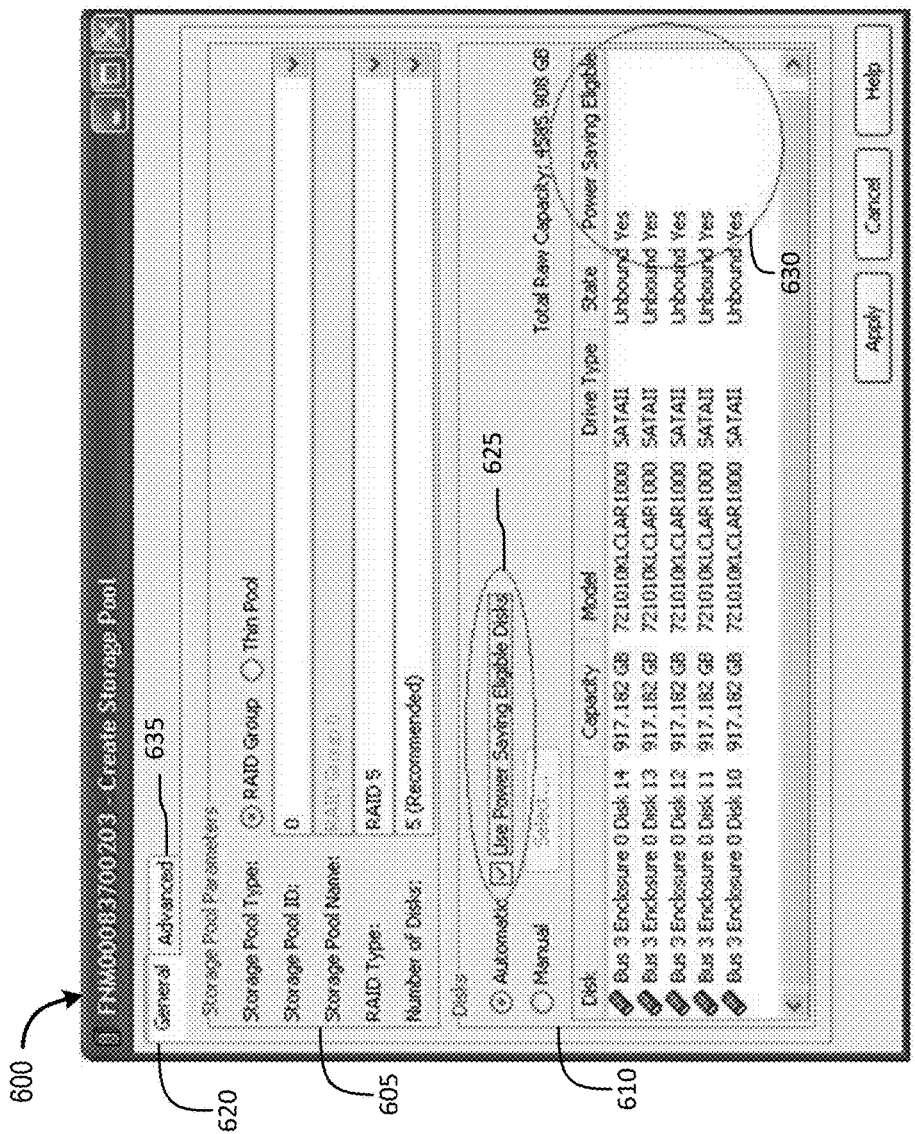

FIG. 6 illustrates a Create Storage Pool GUI 600 having a General tab 620 that includes a Storage Pool Parameters field 605 and a Disks 610 field. If the Disk Power Saving feature is supported, a check box "Use Power Saving Eligible Disks" 625 will be added in the Disk Selection section 610. If the Disk Power Saving feature is not supported, the "Use Power Saving Eligible Disks" option will be invisible. If the "Automatic" radio button is selected, the Use Power Saving Eligible Disks check box will be unchecked and the option "Use Power Saving Eligible Disks" is available to be checked by the user. If the radio button "Manual" is selected, the Use Power Saving Eligible Disks check box will be grayed out.

If the Disk Power Saving feature is supported, a Power Saving Eligible column 630 in the disk table will be available to provide information indicating if a disk is eligible for power savings.

If Thin Provisioning is supported, there are the two choices of Storage Pool Type in the Storage Pool Parameters section 605: RAID Group and Thin Pool. When RAID Group is selected to be the Storage Pool Type, the check box "Use Power Saving Eligible Disks" is enabled where a user has the option to select Power Saving Eligible disks. The Power Saving Eligible column is also shown in the disk table. If Thin Pool is selected to be the Storage Pool Type, the check box "Use Power Saving Eligible Disks" is disabled and there is no Power Saving Eligible column displayed in the disk table.

The advanced tab 635 (not shown) includes a RAID Group Power Settings section providing the following feature where if the Disk Power Saving feature is supported, a check box "Allow Power Savings" will be added in the Advanced Tab and will allow the user to turn on power savings at the creation time of the RAID group. The Allow Power Savings default is off and the check box is unchecked. If the Disk Power Savings feature is not supported, the check box "Allow Power Savings" will not be displayed.

Figure 7:
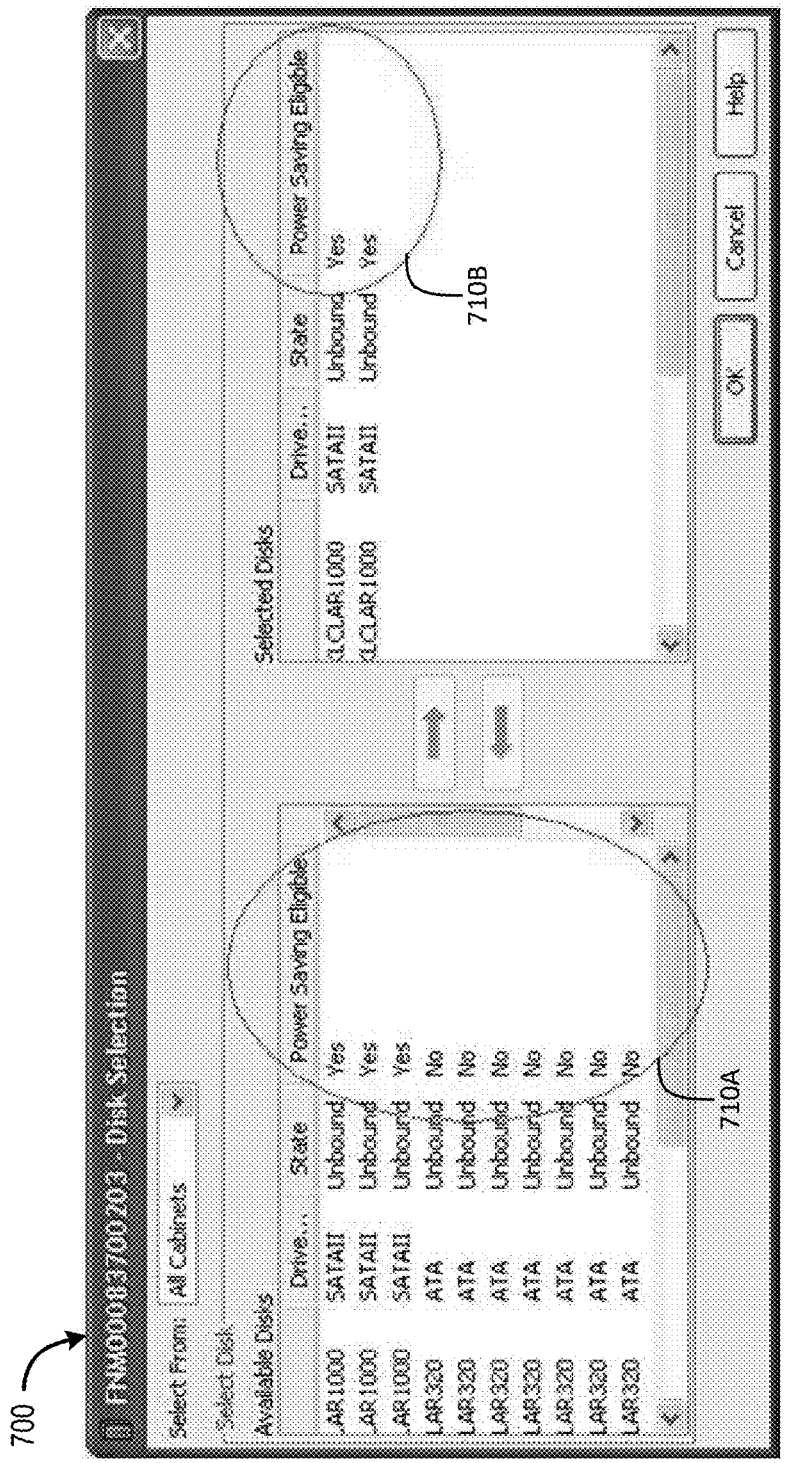

FIG. 7 illustrates a Disk Selection dialog GUI 700. At creation time of a RAID group, if the user selects the radio button "Manual" in the Create Storage Pool dialog (described above in FIG. 6), by clicking the "Select . . ." button, the Disk Selection dialog 700 will appear. The column Power Saving Eligible 710A and 710B will be added in both available disks table and selected disks table, respectively, if the Disk Power Saving feature is supported.

Figure 8:
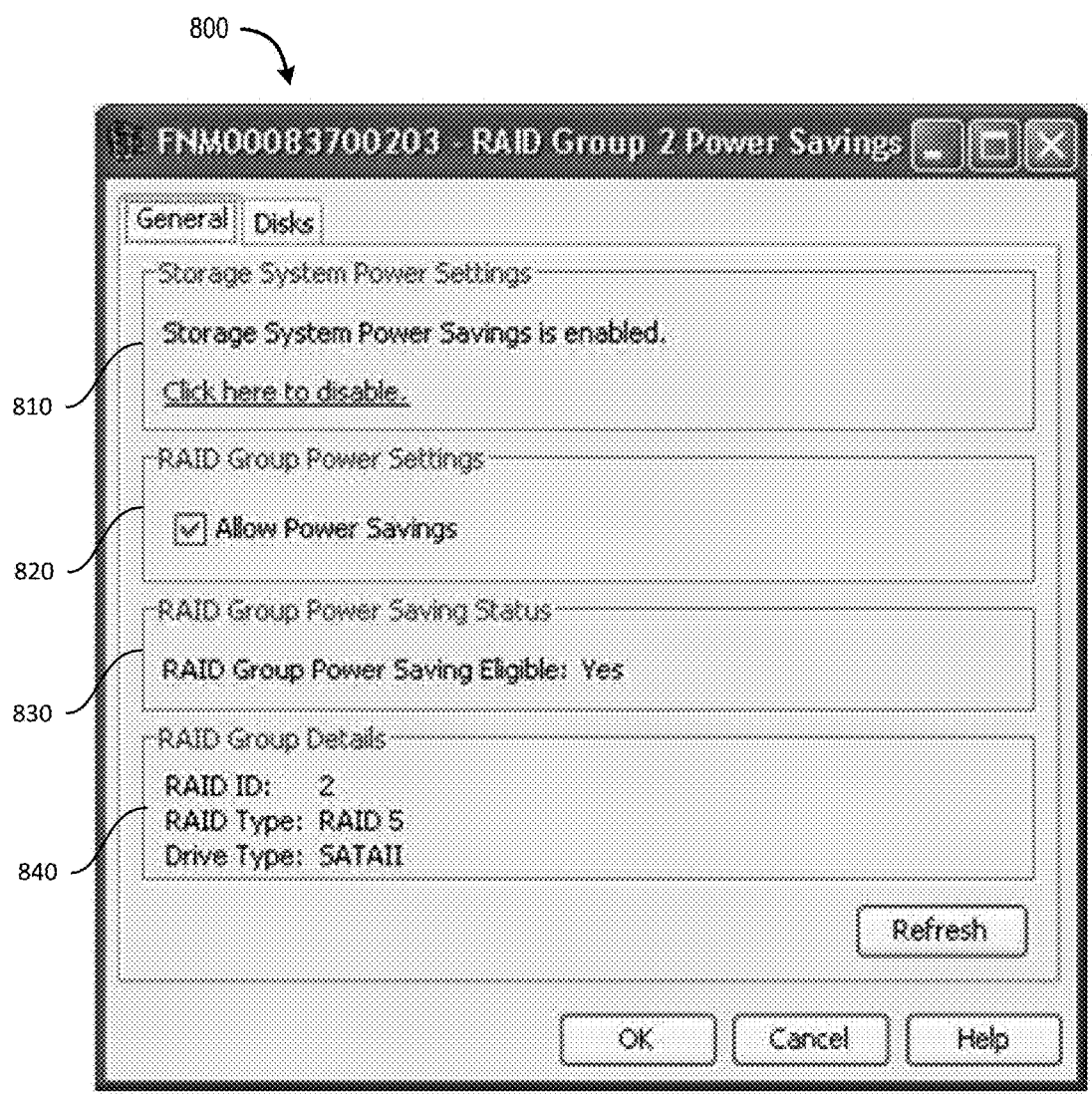

FIG. 8 illustrates a RAID Group Power Savings dialog GUI 800 having a General tab and Disks tab. The General tab includes a Storage System Power Settings section 810, RAID Group Power Settings section 820, RAID Group Power Saving Status section 830, and a RAID Group Details section 840. The Storage System Power Savings 810 includes information indicating whether the storage system wide power saving setting is enabled or disabled. The Click here to enable/disable is a link to the Storage System Power Savings dialog that may be activated by clicking the link. The RAID Group Power Settings 820 includes an Allow Power Savings check box to provide to a user the ability to enable power savings for this RAID group. The RAID Group Power Saving Status section 830 includes a RAID Group Power Saving Eligible information field that shows if the disks in this RAID group are qualified for Power Saving and if there are no hardware restrictions (e.g., slot location) keeping them from spinning down. If the value is No, it will link to the Disks tab of this dialog GUI (described in FIG. 9). The RAID Group Details section 840 includes information relating to the RAID group including, for example: RAID ID, RAID TYPE, and Drive Type.

Figure 9:
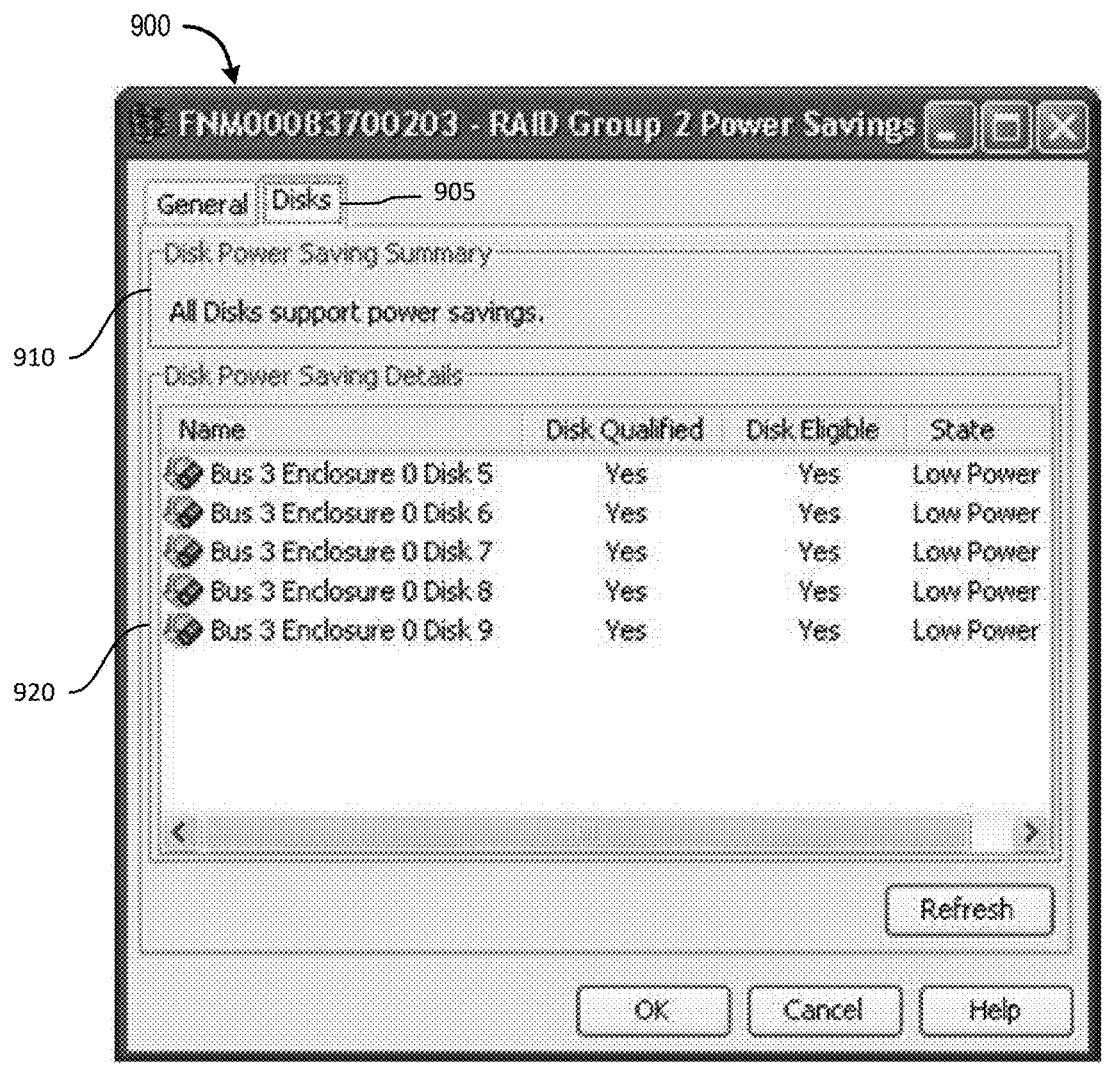

FIG. 9 illustrates a RAID Group Power Savings dialog GUI 900 with the Disks 905 tab selected. This tab 905 includes a Disk Power Saving Summary section 910 and a Disk Power Saving Details section 920. The Disk Power Saving Summary section 910 includes an informational indicator such as "All disks support power savings" when all disks are disk qualified and disk eligible, or "One or more disks do not support power savings" when there are one or more disks that are not disk qualified or slot eligible.

The Disk Power Saving Details section 920 may be a table that includes four columns: Name, Disk Qualified, Disk Eligible, and State. Name column displays disk icons and names associated with a disk. The icons shown here are based on the disk power saving state (e.g., Full Power, Transitioning, or Low Power). The Disk Qualified column displays a Yes/No value that may be provided by a disk vendor to indicate whether the disk is capable of operating in a power saving mode. The Disk Eligible column displays a Yes/No value to indicate disk eligibility. If the value is No, there may be a tooltip to display a message indicating "The slot location of the disk will not participate any power savings." This indicates that the drive is qualified for power saving, but there are slot location restrictions keeping the drive from transitioning to a low power state. The State column indicates the power saving state of the drive. Example values may include Full Power, Low Power, Reduced Power Up (Transitioning from Low Power to Full Power), Reduced Power Down (Transitioning from Full Power to Low Power), and Removed.

Figure 10:
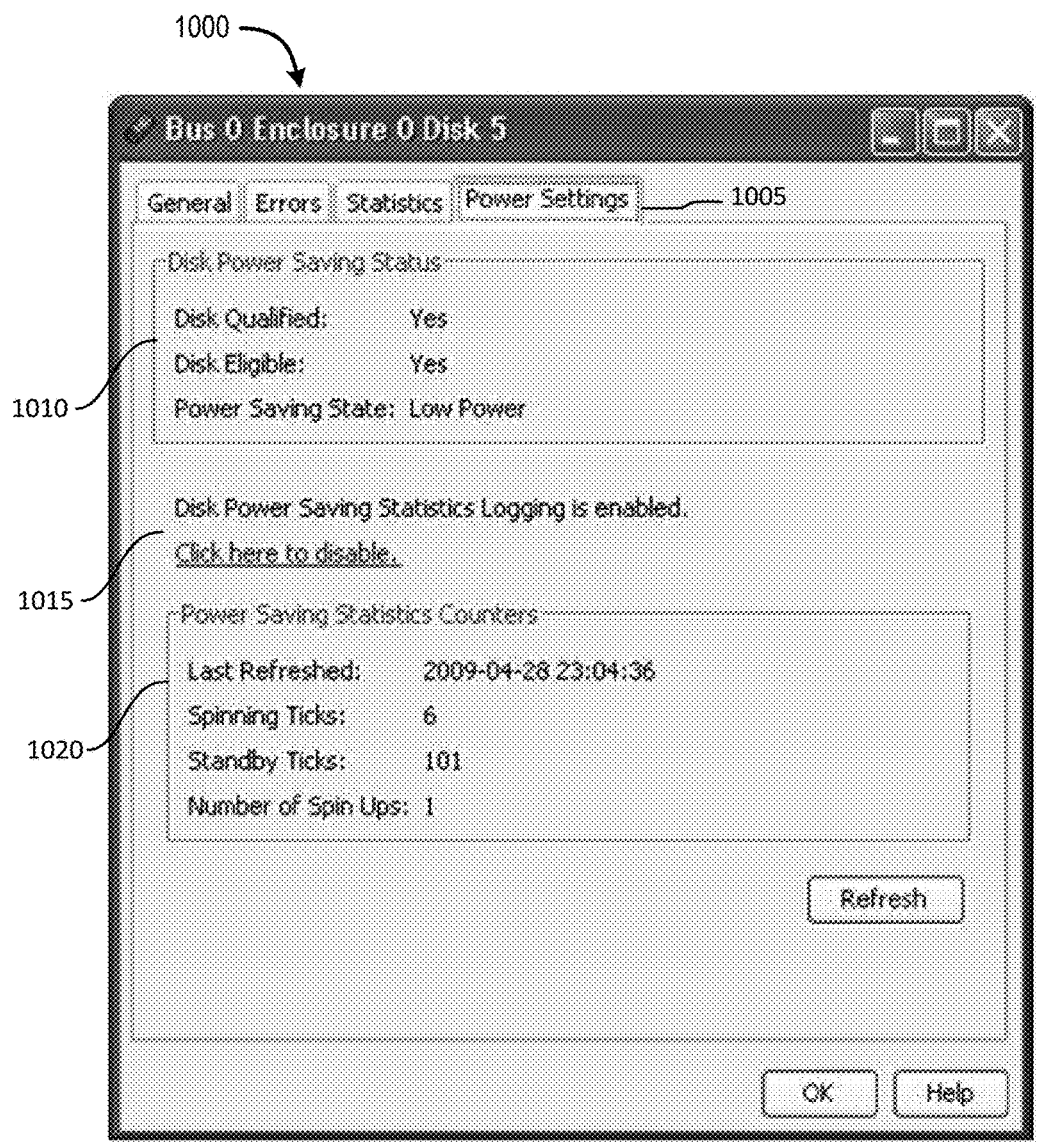

FIG. 10 illustrates a Disk Properties dialog GUI 1000 that includes General, Errors, Statistics, and Power Settings tabs. The Power Settings tab 1005 includes a Disk Power Saving Status section 1010, logging information 1015, and a Power Saving Statistics Counters section 1020. The Disk Power Saving Status section 1010 includes a Disk Qualified field with a yes/no value. If all system hardware requirements are met and the value is yes, the drive is allowed to transition to a Low Power standby state. A Disk Eligible field indicates that a drive is qualified for power saving and is also allowed to spin down based on its location in the array. The Power Saving State field may include an indicator such as Full Power, Low Power, Reduced Power Up (Transitioning from Low Power to Full Power), Reduced Power Down (Transitioning from Full Power to Low Power), and Removed.

Logging information 1015 includes an indicator indicating whether logging is enabled or disabled and a "Click here to disable" link to the Storage System Power Savings dialog GUI to allow a user to enable/disable disk power saving statistics logging.

The Power Saving Statistics Counters section 1020 includes various information such as time and date when last refreshed, number of Spinning Ticks, number of Standby Ticks, and Number of Spin Ups.

It should be noted that execution of the method may be dependent on receiving permission from a system administrator or process. The administrator may have the ability to start, monitor, and stop the method at their discretion. This may be useful in the case where a drive in a RAID group is in power saving mode and another drive (or the spun down drive) in the RAID group fails. In this case, the system administrator may halt the method and spin up any drives in spin down mode in order to, for example, initiate a rebuild procedure. Any subsequent I/O requests may be delayed by the disk spin up time. Alternatively, or in addition, the method may be automatically started, monitored and stopped by the storage processor or other high level procedure.

The subject matter described herein for managing disk drive power saving in data storage systems may be implemented in hardware, software, firmware, or any combination thereof. As such, the terms "system" or "logic" as used herein may refer to software in combination with hardware and/or firmware for implementing the feature being described. In one example implementation, the subject matter described herein may be implemented using a non-transitory computer readable medium having stored thereon computer executable instructions that when executed by the processor of a computer perform steps.

Exemplary non-transitory computer readable media suitable for implementing the subject matter described herein include disk memory devices, chip memory devices, programmable logic devices, and application specific integrated circuits. In addition, a computer program product that implements the subject matter described herein may be located on a single device or computing platform or may be distributed across multiple devices or computing platforms.

Figure 11:
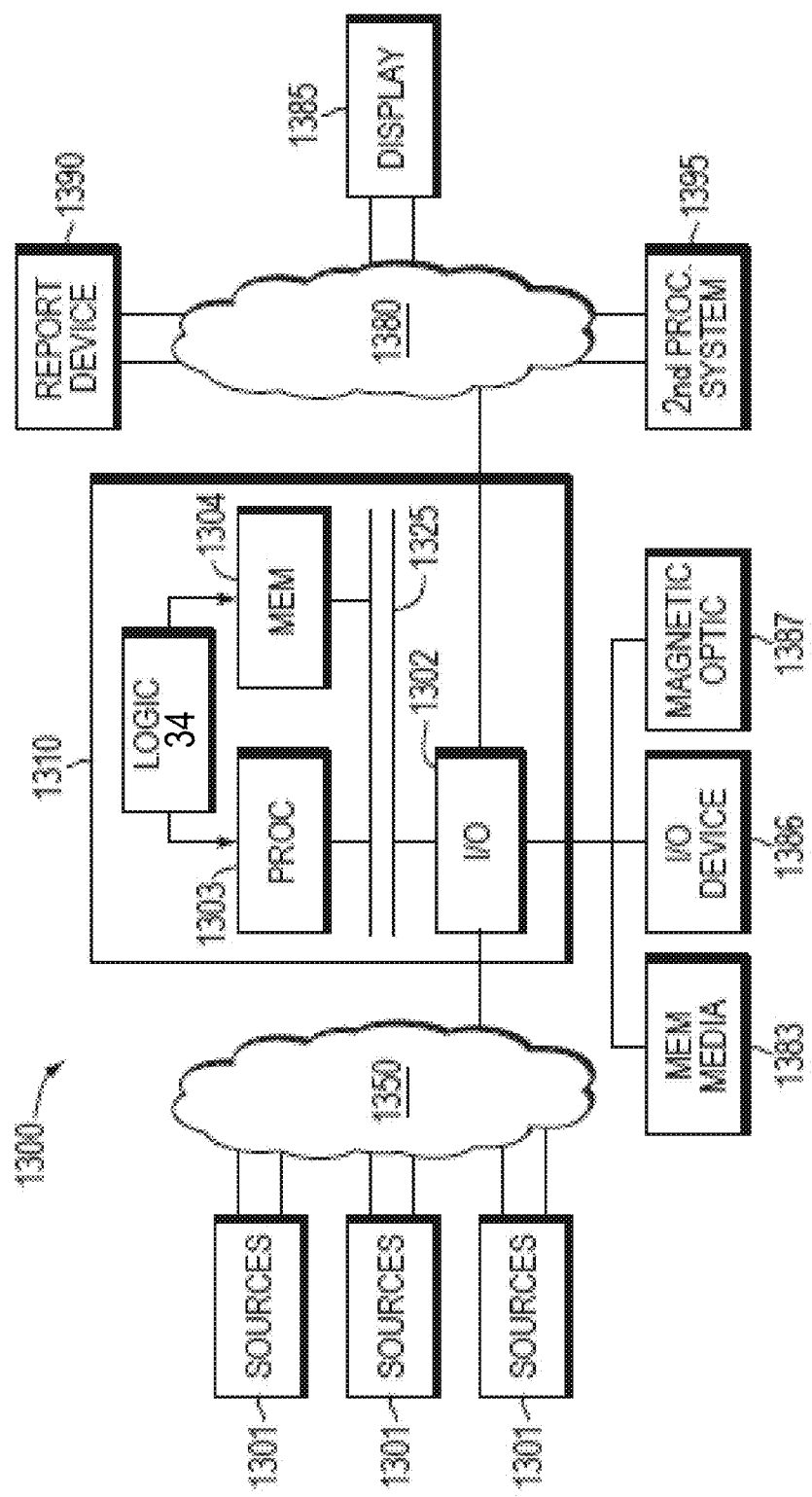
FIG. 11 is an example embodiment of a system that may carry out method steps described herein, in accordance with an embodiment of the present disclosure.
Figure 12:
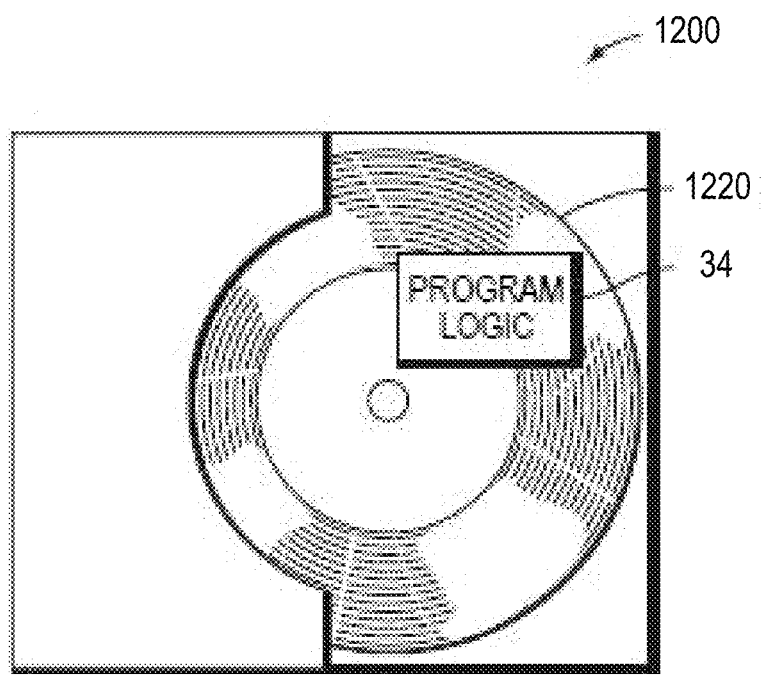
FIG. 12 is an example of a non-transitory computer readable medium having stored thereon computer executable instructions in the form of program logic, that when executed by the processor of a computer perform method steps as described herein.

Accordingly, when the program code is loaded into and executed by a machine, such as the computer of FIG. 11, the machine becomes an apparatus for practicing the invention. When implemented on one or more general-purpose processors, the program code combines with such a processor to provide a unique apparatus that operates analogously to specific logic circuits. As such, a general purpose digital machine can be transformed into a special purpose digital machine. FIG. 12 shows Program Logic 34 embodied on a computer-readable medium 1220 as shown, and wherein the Logic is encoded in computer-executable code configured for carrying out the techniques describe herein and thereby forming a Computer Program Product 1200. Logic 34 of FIG. 11 may be loaded into memory 1304 and executed by processor 1303. Logic 34 may also be the same logic 34 on computer readable medium 1220.

The logic for carrying out the method may be embodied as part of the aforementioned system, which is useful for carrying out a method described with reference to embodiments shown in, for example, FIGS. 4-10. For purposes of illustration, the invention is described as embodied in a specific configuration and using special logical arrangements, but one skilled in the art may appreciate that the device is not limited to the specific configuration but rather only by the claims included with this specification.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing disk drive power saving in data storage systems, the method comprising:
identifying, in a data storage system, multiple storage elements, wherein each identified storage element is capable of operating in a power saving mode;
grouping the identified storage elements into multiple RAID groups;
creating one or more logical units (LUNs) from the RAID groups;
exposing the one or more LUNs to a server;
associating the one or more LUNs to a particular user application running at the server, wherein the particular user application is associated with a data risk parameter;
determining power usage for the RAID groups comprising the one or more LUNs, wherein the determined power usage is based on the particular user application;
determining multiple power saving settings, wherein each setting is based on a particular arrangement of the one or more LUNs associated with the particular user application in a particular RAID group;
communicating to a user the multiple power saving settings, receiving, from the user, a power saving setting selected from the multiple power saving settings; and enabling a power saving mode based on one of the user selected power saving setting.

2. The method of claim 1, further including providing a user interface for displaying current selection of multiple parameters associated with power saving.

3. The method of claim 2, wherein the user interface includes receiving input from a user where the input is associated with one or more power saving settings.

4. The method of claim 2, wherein the user interface includes a selection associating a power setting to all the RAID groups in a data storage system.

5. The method of claim 2, wherein the user interface includes a selection associating a power setting to an individual RAID group.

6. The method of claim 1, wherein creating one or more LUNs includes arranging the LUNs to increase the likelihood that storage elements in the RAID group remain idle for extended periods of time.

7. The method of claim 1, further including logging performance metrics.

8. The method of claim 7 further including creating a report based on the performance metrics.

9. The method of claim 7 further including rearranging LUNs between different RAID groups to increase storage element idle time, wherein LUN to RAID group rearranging is based on the performance metrics.

10. A system for use in managing disk drive power saving in data storage systems, the system comprising hardware logic configured to:
identify, in a data storage system, multiple storage elements, wherein each identified storage element is capable of operating in a power saving mode;
group the identified storage elements into multiple RAID groups; create one or more logical units (LUNs) from the RAID groups;
expose the one or more LUNs to a server;
associate the one or more LUNs to a particular user application running at the server, wherein the particular user application is associated with a data risk parameter;
determine power usage for the RAID groups comprising the one or more LUNs, wherein the determined power usage is based on the particular user application;
determine multiple power saving settings, wherein each setting is based on a particular arrangement of the one or more LUNs associated with the particular user application in a particular RAID group;
communicate to a user the multiple power saving settings, receive, from the user, a power saving setting selected from the multiple power saving settings; and
enable a power saving mode based on one of the power saving settings.

11. The system of claim 10, further configured to provide a user interface for displaying and modifying a current selection of multiple parameters associated with power saving.

12. The system of claim 11, wherein the user interface includes receiving input from a user where the input is associated with one or more power saving settings.

13. The system of claim 11, wherein the user interface includes a selection associating a power setting to all the RAID groups in a data storage system.

14. The system of claim 11, wherein the user interface includes a selection associating a power setting to an individual RAID group.

15. The system of claim 10, wherein creating one or more LUNs includes arranging the LUNs to increase the likelihood that storage elements in the RAID group remain idle for extended periods of time.

16. The system of claim 10, further including logging performance metrics.

17. The system of claim 16 further including creating a report based on the performance metrics.

18. The system of claim 16 further including rearranging LUNs between different RAID groups to increase storage element idle time, wherein LUN to RAID group rearranging is based on the performance metrics.

19. A non-transitory computer readable medium having stored thereon computer executable instructions that when executed by the processor of a computer perform steps comprising:
identifying, in a data storage system, multiple storage elements, wherein each identified storage element is capable of operating in a power saving mode;
grouping the identified storage elements into multiple RAID groups; creating one or more logical units (LUNs) from the RAID groups;
exposing the one or more LUNs to a server;
associating the one or more LUNs to a particular user application running at the server, wherein the particular user application is associated with a data risk parameter;
determining power usage for the RAID groups comprising the one or more LUNs, wherein the determined power usage is based on the particular user application;
determining multiple power saving settings, wherein each setting is based on a particular arrangement of the one or more LUNs associated with the particular user application in a particular RAID group;
communicating to a user the multiple power saving settings, receiving, from the user, a power saving setting selected from the multiple power saving settings; and
enabling a power saving mode based on one of the user selected power saving setting.

20. The computer program product of claim 19, further including providing a user interface for displaying current selection of multiple parameters associated with power savings.

* * * * *